(12) United States Patent
O'Quinn et al.

(10) Patent No.: US 11,413,784 B1
(45) Date of Patent: Aug. 16, 2022

(54) METHOD FOR MANUFACTURING WOOD PRODUCTS FORMED FROM NATURAL VENEER SHEETS AND VENEER STRANDS

(71) Applicant: Boise Cascade Company, Boise, ID (US)

(72) Inventors: Neill O'Quinn, Lena, LA (US); John White, Medford, OR (US); David Ruth, White City, OR (US); Jeff Lewis, White City, OR (US); Paige McKinley, White City, OR (US)

(73) Assignee: Boise Cascade Company, Boise, ID (US)

( * ) Notice: Subject to any disclaimer, the term of this patent is extended or adjusted under 35 U.S.C. 154(b) by 0 days.

(21) Appl. No.: 17/129,525

(22) Filed: Dec. 21, 2020

Related U.S. Application Data

(63) Continuation-in-part of application No. 16/005,492, filed on Jun. 11, 2018, now abandoned.

(60) Provisional application No. 62/518,411, filed on Jun. 12, 2017.

(51) Int. Cl.
| | |
|---|---|
| *B27N 3/06* | (2006.01) |
| *B27N 3/02* | (2006.01) |
| *B32B 5/16* | (2006.01) |
| *B27D 5/00* | (2006.01) |
| *B32B 21/14* | (2006.01) |
| *B32B 7/12* | (2006.01) |
| *B32B 21/12* | (2006.01) |

(52) U.S. Cl.
CPC .................. *B27N 3/06* (2013.01); *B27D 5/00* (2013.01); *B27N 3/02* (2013.01); *B32B 5/16* (2013.01); *B32B 7/12* (2013.01); *B32B 21/12* (2013.01); *B32B 21/14* (2013.01); *Y10T 156/1061* (2015.01)

(58) Field of Classification Search
None
See application file for complete search history.

(56) References Cited

U.S. PATENT DOCUMENTS

| | | |
|---|---|---|
| 1,805,179 A | 5/1931 | Loetscher |
| 2,233,875 A | 3/1941 | Schmidt et al. |
| 2,356,625 A | 8/1944 | Schumann |
| 2,409,785 A | 10/1946 | Newmark et al. |
| 2,642,371 A | 6/1953 | Fahrni |

(Continued)

FOREIGN PATENT DOCUMENTS

| | | |
|---|---|---|
| WO | WO 2011/137537 | 11/2011 |

*Primary Examiner* — Linda L Gray
(74) *Attorney, Agent, or Firm* — Hawley Troxell Ennis & Hawley LLP; Philip McKay

(57) ABSTRACT

A method of manufacturing includes cutting a first natural or non-composite veneer sheet to a first length, cutting a second natural or non-composite veneer sheet to the first length, coating an inner surface of the first natural or non-composite veneer sheet with an adhering means, coating an inner surface of the second natural or non-composite veneer sheet with an adhering means, coating a plurality of veneer strands with an adhering means, placing the plurality of veneer strands on the inner surface of the first natural or non-composite veneer sheet, placing the second natural or non-composite veneer sheet on top of the plurality of veneer strands to create a mat, compressing the mat in an unheated pre-press, and compressing the mat in a hot press at an elevated temperature to create a panel.

6 Claims, 11 Drawing Sheets

(56) References Cited

U.S. PATENT DOCUMENTS

| | | | | |
|---|---|---|---|---|
| 3,790,417 | A * | 2/1974 | Paterson | B27N 3/00 |
| | | | | 156/62.8 |
| RE30,636 | E | 6/1981 | Barnes | |
| 4,471,012 | A | 9/1984 | Maxwell | |
| 4,494,919 | A * | 1/1985 | Knudson | B27N 3/14 |
| | | | | 425/456 |
| 4,610,913 | A | 9/1986 | Barnes | |
| 4,619,723 | A * | 10/1986 | Takagi | D04H 1/70 |
| | | | | 19/301 |
| 4,844,763 | A | 7/1989 | Robbins | |
| 5,096,765 | A | 3/1992 | Barnes | |
| RE34,283 | E | 6/1993 | Barnes | |
| 5,786,063 | A * | 7/1998 | Shibusawa | B27M 1/08 |
| | | | | 144/333 |
| 6,029,520 | A | 2/2000 | Beall et al. | |
| 6,201,224 | B1 | 3/2001 | Churchland et al. | |
| 6,402,877 | B1 | 6/2002 | Bielfeldt | |
| 6,652,789 | B1 * | 11/2003 | Pearson | B27N 3/04 |
| | | | | 425/81.1 |
| 6,773,540 | B2 * | 8/2004 | Kaneko | B32B 21/08 |
| | | | | 156/283 |
| 8,075,717 | B2 | 12/2011 | Parker | |
| 8,372,520 | B2 | 2/2013 | Parker | |
| 2007/0116940 | A1 | 5/2007 | Ou et al. | |
| 2007/0122644 | A1 * | 5/2007 | Jarck | B27N 1/00 |
| | | | | 264/109 |
| 2008/0000548 | A1 * | 1/2008 | Liu | B27N 1/00 |
| | | | | 144/369 |
| 2009/0314437 | A1 | 12/2009 | Matsumura et al. | |
| 2014/0299252 | A1 * | 10/2014 | Abe | D04H 1/4218 |
| | | | | 264/122 |
| 2015/0064390 | A1 * | 3/2015 | Gustafsson | E04C 2/246 |
| | | | | 428/192 |
| 2016/0361833 | A1 * | 12/2016 | Wang | B27D 1/04 |

* cited by examiner

METHOD FOR MANUFACTURING WOOD PRODUCTS FORMED FROM NATURAL VENEER SHEETS AND VENEER STRANDS

RELATED APPLICATIONS

This application is a continuation-in part of O'Quinn, et al., U.S. application Ser. No. 16/005,492 filed on Jun. 11, 2018, which claims the benefit of O'Quinn et al., U.S. Provisional Application No. 62/518,411, filed on Jun. 12, 2017, which is hereby incorporated by reference in its entirety as if it were fully set forth herein.

FIELD

The present disclosure relates generally to structural wood products and particularly to composite wood products formed from natural sheets of veneer cut from a continuous ribbon of veneer and wood byproducts such as veneer strands.

BACKGROUND

Composite wood products are known in the art. One such product is parallel strand lumber, which consists of a large number of strands of lumber (e.g., veneer) glued and pressed together under high pressure to form a composite wood product (e.g., a wood beam). This type of composite wood product made from a large number of strands tends to be stronger, denser, and more consistent than wood products made from only one or a few large pieces of lumber since any imperfections in any of the strands are dispersed throughout the composite product. However, because parallel strand lumber consists solely of strands, the surface of such a product tends to not be as smooth and consistent as the surface of wood products that are not made from strands. There can be void areas between strands on the surface or bits of glue on the surface. Thus, parallel strand lumber can be difficult to use in applications where aesthetics is important and/or that involve affixing fasteners to the surface or laminating additional wood products to the surface to create larger composite products.

Some prior art composite wood products sandwich veneer strands between outer layers of composite sheets or structures formed of multiple particles, parts, or pieces of wood, such as unoriented superimposed flat wood shavings, and glue. U.S. Pat. No. 2,642,371, issued to Fahrni is one example of prior art structures that employ outer layer composite structures formed of superimposed flat wood shavings and glue. These prior art structures that employ outer layers of composite sheets or structures formed of multiple particles, parts, or pieces of wood, such as unoriented superimposed flat wood shavings, and glue can represent a cost savings compared to the use of full sheets of veneer cut from ribbons of veneer peeled from logs, i.e., natural or non-composite full veneer sheets. However, when outer layers of composite sheets or structures formed of multiple particles, parts, or pieces of wood, such as unoriented superimposed flat wood shavings, and glue are used, the resulting structure is more complicated, harder and more complicated to manufacture, less aesthetically pleasing, and potentially less structurally sound. These disadvantages of outer layer composite structures formed of multiple particles, parts, or pieces of wood, such as unoriented superimposed flat wood shavings, and glue, often outweigh the cost savings of these structures, especially when the wood product is used in applications where appearance is important.

Consequently, in many cases, the use of natural or non-composite veneer sheets for outer layers, and even internal layers of composite wood products, is often preferred over outer layer composite structures formed multiple particles, parts, or pieces of wood, such as unoriented superimposed flat wood shavings, and glue. However, historically, the use of natural or non-composite veneer sheets for layers of composite structures has presented several issues as well.

For instance, International Patent Publication No. WO2011/137537 by Applicant FPINNOVATIONS (the "FPINNOVATIONS Publication") describes a composite wood product consisting of a layer of veneer strands, similar to parallel strand lumber, surrounded by veneer sheets.

The FPINNOVATIONS Publication describes a manufacturing process involving applying resin to veneer sheets and veneer strands, aligning the layers of the veneer sheets and veneer strands into a mat, and pressing the mat with a hot press. The FPINNOVATIONS Publication further describes preheating the mat before it is placed in the press. The FPINNOVATIONS invention requires preheating the mat to obtain the desired thicker mat (e.g., thicker than 2.5 inches) in order to soften the wood throughout. As taught in the FPINNOVATIONS Publication. if a mat having a certain thickness is placed into a hot press without preheating, the outside of the mat may burn before the center of the mat reaches the desired temperature. This process is not desirable however, as the necessity of preheating the mat requires additional time, equipment. and expense.

Thus, there is a need for a composite wood product that includes natural or non-composite full veneer sheets for either outer or inner layers of the composite wood product as well as a need for an improved and more efficient method of manufacturing this type of product that does not require preheating and/or avoids other long standing technical problems encountered when making a composite wood product.

SUMMARY

Embodiments of the present disclosure provide an effective and efficient technical solution to the long-standing technical problem of providing a method and system for manufacturing composite wood products from veneer that include natural or non-composite full veneer sheets for either outer or inner layers of the composite structure in an improved and more efficient way that does not require preheating and/or avoids other long standing technical problems encountered when making a composite wood product.

To this end, disclosed herein are wood composite product panels and beams, and methods of manufacturing composite wood product panels and beams, from natural or non-composite full veneer sheets and veneer strands.

In one representative embodiment, a method can include cutting a first natural or non-composite veneer sheet to a first length, cutting a second natural or non-composite veneer sheet to the first length, coating an inner surface of the first natural or non-composite veneer sheet with an adhering means, coating an inner surface of the second natural or non-composite veneer sheet with an adhering means, coating a plurality of veneer strands with an adhering means, placing the plurality of veneer strands on the inner surface of the first natural or non-composite veneer sheet, placing the second natural or non-composite veneer sheet on top of the plurality of veneer strands to create a composite wood product mat, compressing the mat in an unheated pre-press, and then compressing the mat in a hot press at an elevated temperature to create a composite wood product panel.

In some embodiments, the method can include coupling an end portion of the composite wood product panel to an end portion of a second composite wood product panel via a finger joint. In some embodiments, the method can include coupling an end portion of the composite wood product panel to an end portion of a second wood product via a finger joint. In some embodiments, the second wood product can be parallel laminated veneer.

In some embodiments, the method can include laminating an outer surface of the composite wood product panel to an outer surface of a second composite wood product panel. In some embodiments, the method can include laminating an outer surface of the composite wood product panel to an outer surface of a second wood product.

In some embodiments, the method can include, after creating the mat, stacking a plurality of mats on top of each other, compressing the stacked mats in the unheated pre-press, and placing at least one mat from the stacked mats into the hot press and compressing the mat in the hot press at an elevated temperature.

In some embodiments, the method can include monitoring the density of veneer strands at various locations on the first natural or non-composite veneer sheet as the plurality of veneer strands are placed on the inner surface of the first natural or non-composite veneer sheet, and placing at least one additional veneer strand at a particular location on the inner surface of the first natural or non-composite veneer sheet based on the monitored density prior to placing the second natural or non-composite veneer sheet on the plurality of veneer strands.

In some embodiments, the method can include placing the first natural or non-composite veneer sheet on a conveyor prior to placing the plurality of veneer strands on the first natural or non-composite veneer sheet, and placing the plurality of veneer strands on the inner surface of the first natural or non-composite veneer sheet as the first natural or non-composite veneer sheet moves along the conveyor. In some embodiments, the method can include adjusting the speed of the conveyor to achieve a desired density of veneer strands placed on the first natural or non-composite veneer sheet.

In some embodiments, the first plurality of veneer strands can comprise at least two different species of wood. In some embodiments, the plurality of veneer strands can comprise at least two veneer strands having different lengths. In some embodiments, the plurality of veneer strands can comprise at least two veneer strands having different widths. In some embodiments, the plurality of veneer strands can comprise at least two veneer strands having different thicknesses.

In some embodiments, the pre-press can have edge dams to prevent one or more of the plurality of veneer strands from falling out of the mat while the mat is being compressed in the pre-press.

In some embodiments, the method can include placing a third natural or non-composite veneer sheet in a first strander to create the plurality of veneer strands and place the veneer strands onto the first natural or non-composite veneer sheet. In some embodiments, the first strander can cut the third natural or non-composite veneer sheet into the plurality of veneer strands.

In some embodiments, the method can include placing a fourth natural or non-composite veneer sheet in a second strander, wherein both the first and second strander place veneer strands onto the first natural or non-composite veneer sheet. In some embodiments, the first strander can place veneer strands onto the first natural or non-composite veneer sheet at a first angle with respect to the first natural or non-composite veneer sheet and the second strander can place veneer strands onto the first natural or non-composite veneer sheet at a second angle with respect to the first natural or non-composite veneer sheet, wherein the first angle is different from the second angle.

In another representative embodiment, a method of manufacturing can include coating a first natural or non-composite veneer sheet with an adhesive means, coating a second natural or non-composite veneer sheet with an adhesive means, coating a plurality of veneer strands with an adhesive means, placing a first natural or non-composite veneer sheet on a conveyor that causes the first natural or non-composite veneer sheet to move along a first direction, placing the plurality of veneer strands on top of the first natural or non-composite veneer sheet while the first natural or non-composite veneer sheet moves along the first direction, placing the second natural or non-composite veneer sheet on top of the plurality of veneer strands to create a mat, cutting the mat to a length of about 101 inches, placing the mat in a pre-press and compressing the mat, placing the compressed mat in a hot press and further compressing the mat to create a composite wood product panel, and cutting the composite wood product panel to a desired length and width.

In another representative embodiment, a composite wood product can be prepared by any of the above processes. For instance, in one embodiment, a composite wood product panel is disclosed including: a first natural veneer sheet cut to a first length; a second natural veneer sheet cut to the first length; a layer of adhesive coating an inner surface of the first natural veneer sheet; a layer of adhesive coating an inner surface of the second natural veneer sheet; and a plurality of veneer strands coated with adhesive, the plurality of veneer strands positioned between the inner surface of the first natural veneer sheet and the inner surface of the second natural veneer sheet. In one embodiment, the first natural veneer sheet, second natural veneer sheet, the adhesive coating an inner surface of the first natural veneer sheet, the adhesive coating an inner surface of the second natural veneer sheet, and the plurality of veneer strands coated with adhesive have been compressed using an unheated pre-press and then compressed using a hot press at an elevated temperature.

In another embodiment, a composite wood product is disclosed including a first composite wood product panel. In one embodiment, the first composite wood product panel includes: a first natural veneer sheet cut to a first length; a second natural veneer sheet cut to the first length; a layer of adhesive coating an inner surface of the first natural veneer sheet; a layer of adhesive coating an inner surface of the second natural veneer sheet; and a first plurality of veneer strands coated with adhesive, the first plurality of veneer strands positioned between the inner surface of the first natural veneer sheet and the inner surface of the first natural veneer sheet. In one embodiment, the first natural veneer sheet, second natural veneer sheet, the adhesive coating an inner surface of the first natural veneer sheet, the adhesive coating an inner surface of the second natural veneer sheet, and the first plurality of veneer strands coated with adhesive have been compressed using an unheated pre-press and then compressed using a hot press at an elevated temperature.

In one embodiment, the composite wood product also includes a second wood product and an end portion of the first composite wood product panel coupled to an end portion of a second wood product via a finger joint. In one embodiment, the second wood product is a second composite wood product panel including: a third natural veneer sheet cut to a first length; a fourth natural veneer sheet cut to the first length; a layer of adhesive coating an inner surface of the third natural veneer sheet; a layer of adhesive coating an inner surface of the fourth natural veneer sheet; and a second plurality of veneer strands coated with adhesive, the second plurality of veneer strands positioned between the inner surface of the third natural veneer sheet and the inner surface of the fourth natural veneer sheet. In one embodiment, the third natural veneer sheet, fourth natural veneer sheet, the adhesive coating an inner surface of the third natural veneer sheet, the adhesive coating an inner surface of the fourth natural veneer sheet, and the second plurality of veneer strands coated with adhesive have been compressed using an unheated pre-press and then compressed using a hot press at an elevated temperature.

In one embodiment, a composite wood product is disclosed including a first composite wood product panel. In one embodiment, the first composite wood product panel includes: a first natural veneer sheet cut to a first length; a second natural veneer sheet cut to the first length; a layer of adhesive coating an inner surface of the first natural veneer sheet; a layer of adhesive coating an inner surface of the second natural veneer sheet; and a first plurality of veneer strands coated with adhesive, the first plurality of veneer strands positioned between the inner surface of the first natural veneer sheet and the inner surface of the first natural veneer sheet. In one embodiment, the first natural veneer sheet, second natural veneer sheet, the adhesive coating an inner surface of the first natural veneer sheet, the adhesive coating an inner surface of the second natural veneer sheet, and the first plurality of veneer strands coated with adhesive have been compressed using an unheated pre-press and then compressed using a hot press at an elevated temperature.

In one embodiment, the composite wood product also includes a second wood product wherein an outer surface of the first composite wood product panel is laminated to an outer surface of the second wood product. In one embodiment, the second wood product is a second composite wood product panel including: a third natural veneer sheet cut to a first length; a fourth natural veneer sheet cut to the first length; a layer of adhesive coating an inner surface of the third natural veneer sheet; a layer of adhesive coating an inner surface of the fourth natural veneer sheet; and a second plurality of veneer strands coated with adhesive, the second plurality of veneer strands positioned between the inner surface of the third natural veneer sheet and the inner surface of the fourth natural veneer sheet. In one embodiment, the third natural veneer sheet, fourth natural veneer sheet, the adhesive coating an inner surface of the third natural veneer sheet, the adhesive coating an inner surface of the fourth natural veneer sheet, and the second plurality of veneer strands coated with adhesive have been compressed using an unheated pre-press and then compressed using a hot press at an elevated temperature.

The foregoing and other objects, features, and advantages of the invention will become more apparent from the following detailed description, which proceeds with reference to the accompanying.

Figure 1:
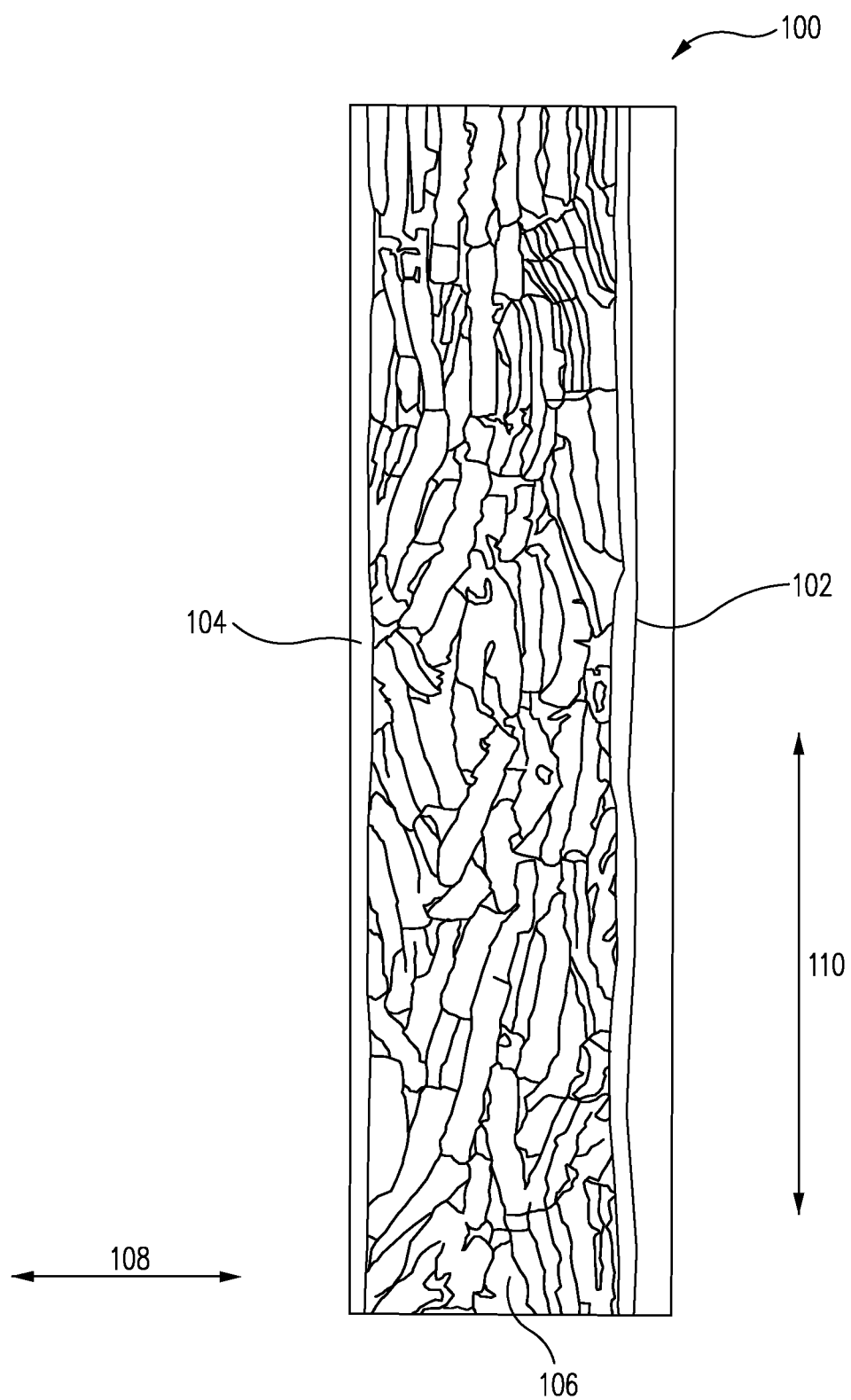
FIG. 1 is a cross-sectional view of an exemplary composite wood product panel as disclosed herein.

Common reference numerals are used throughout the FIGs. and the detailed description to indicate like elements. One skilled in the art will readily recognize that the above FIGs. are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., or described below. Rather, these exemplary embodiments are provided to allow a complete disclosure that conveys the principles of the invention, as set forth in the claims, to those of skill in the art.

Structural wood products are an important building and construction material. They can be used for structural beams, load-bearing beams, spans carrying heavy loads, and many other purposes. Veneer wood can be used to form composite wood products as disclosed herein.

Veneer is a type of wood product that can be obtained by placing a log on a lathe and peeling off a continuous ribbon or sheet having a desired thickness, typically ⅙ inch or less. This continuous ribbon sheet can then be cut to a desired width to create smaller natural veneer sheets of the desired width. As used herein, the terms "natural veneer sheet" and "non-composite veneer sheet" are used interchangeable to refer to full veneer sheets produced by the process of placing a log on a lathe and peeling off a ribbon or parent sheet having a desired thickness and then cutting the ribbon or parent sheet into smaller full sheets of natural veneer of a desired width. Consequently, as used herein, the terms "natural veneer sheet" and "non-composite veneer sheet" refer to a structure that is a continuous and single sheet of wood. This is in contrast to any composite wood sheets formed of multiple particles, parts, or pieces of wood, such as unoriented superimposed flat wood shavings, and glue, or any composite wood sheets discussed herein, and/or as known in the art at the time of filing, and/or as developed or become known after the time of filing that are composed of two or more particles, parts, or pieces. shavings and glue/adhesive.

When the peeling process described above is used to produce natural veneer sheets, it typically also produces veneer pieces that are misshapen and/or of undesirable sizes. These veneer pieces are often structurally sound and just as strong as properly cut natural veneer sheets, yet because they are misshapen and/or of undesirable size, they are typically discarded as a waste product. However, using the teachings disclosed herein, these veneer byproducts can be used to produce composite wood product mats and panels that, in turn, can be used to produce structural wood beams, thereby increasing the efficiency of the veneer wood and product production process, reducing the amount of waste produced and lowering the cost of wood beam manufacturing. Furthermore, the composite wood products disclosed herein have numerous advantages over traditional composite wood products as described in further detail below.

Figure 2:
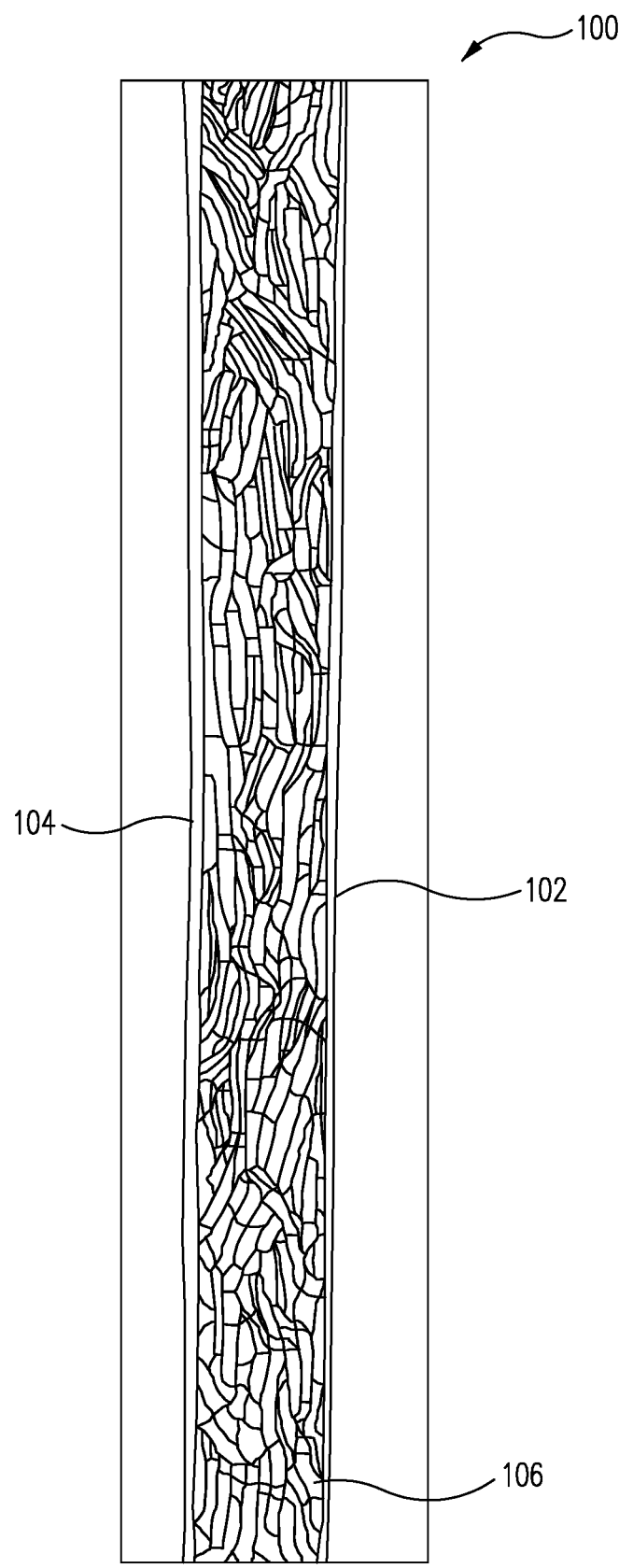
FIG. 2 is another cross-sectional view of an exemplary composite wood product panel as disclosed herein.

FIG. 1 shows a cross-sectional view of an example composite wood product panel 100 constructed in accordance with the teachings herein. FIG. 2 is another cross-sectional view of an exemplary composite wood product panel as disclosed herein. As seen in FIGS. 1 and 2, the composite wood product panel 100 comprises a first natural veneer sheet 102, a second natural veneer sheet 104, and a plurality of veneer strands 106 positioned between the first and second natural veneer sheets 102, 104. In the illustrated example of FIG. 1, the first and second natural veneer sheets 102, 104 generally have a thickness (along a direction 108 in FIG. 1) of ⅙ to ⅛ inch. Alternatively, the first and second natural veneer sheets 102, 104 can have any other thickness greater than or less than ⅙ to ⅛ inch. In the illustrated example of FIG. 1, the first and second natural veneer sheets 102, 104 have a length (along a direction into the page of FIG. 1) of 101 inches and a width (along direction 110 in FIG. 1) of 4 feet. After a composite wood panel is manufactured using the natural veneer sheets 102, 104 as disclosed herein, the composite wood panel can be cut to a length of 8 feet. This length of 8 feet and width of 4 feet are chosen to comply with industry standards. In other examples, the first and second natural veneer sheets 102, 104 can have a different length or width to meet other standards or desired applications.

The plurality of veneer strands 106 are pieces of veneer that have a length (along a direction into the page of FIG. 1) less than or equal to the length of the first and second natural veneer sheets 102, 104 but a substantially smaller width (along a direction 110 in FIG. 1) than the first and second natural veneer sheets. The veneer strands 106 can be produced as a byproduct of the veneer production process described above. In some examples, the veneer strands 106 are produced by placing a veneer sheet into a strander (e.g., a machine that can create and extrude veneer strands), which cuts the veneer sheet into strands having a desired width or widths. In some examples, misshapen natural veneer sheets can be placed into the strander. If a misshapen veneer sheet has different lengths along its width (e.g., it is triangularly shaped and has length that decreases along its width from one end to the other end), then the strander will cut the misshapen veneer sheet into a plurality of veneer strands each having a different length.

The veneer strands 106 can have a width (along direction 110 in FIG. 1) of ¾ of an inch, or ⅜ of an inch, or alternatively, another width suited for a particular application. In some examples, the veneer strands 106 can have varying lengths, widths, and/or thicknesses, which can improve consolidation and minimize card decking. That is, if all of the veneer strands have the same width and are stacked on top of each other, the edge of each veneer strand will tend to align with the edge of every other veneer strand, similar to a deck of cards. This can result in the composite wood beam having zones of weakness at the points where these edges of veneer strands align. However, if the veneer strands have varying widths, the edges of the various veneer strands will not tend to align and the stresses on the wood beam can be more evenly distributed, thereby eliminating any zones of weakness. In some examples, the veneer strands can have varying lengths to allow for better control of thickness and density. The veneer strands 106 can have a thickness (along direction 108 in FIG. 1) of ⅛ inch or alternatively, a different thickness better suited for a particular application. The veneer strands can have a length (along a direction into the page of FIG. 1) of 8 feet or alternatively, any other length. The veneer strands 106 can have substantially the same length as the first and second natural veneer sheets 102, 104. Alternatively, the veneer strands 106 can have a different length than the first and second natural veneer sheets 102, 104.

Each one of the plurality of veneer strands 106 can be coated on either side with a resin, glue, adhesive, or other means for causing the veneer strands 106 to stick together and to stick to the inner surfaces of the first and second natural veneer sheets 102, 104. The inner surfaces of the natural veneer sheets 102, 104 can be coated in a resin, glue or other means to help the natural veneer sheets 102, 104 stick to the veneer strands 106. Herein the term "adhering means" is used to include resin, glue, adhesive, or other means for causing the veneer strands to stick together and to stick to the inner surfaces of the natural veneer sheets. The first and second natural veneer sheets 102, 104 can be compressed together, which can compress the veneer strands 106 allowing the composite wood product mat 100 to have a desired thickness.

The process of manufacturing a wood panel such as composite wood product panel 100 is described in connection with FIGS. 3-5.

Figure 3A:
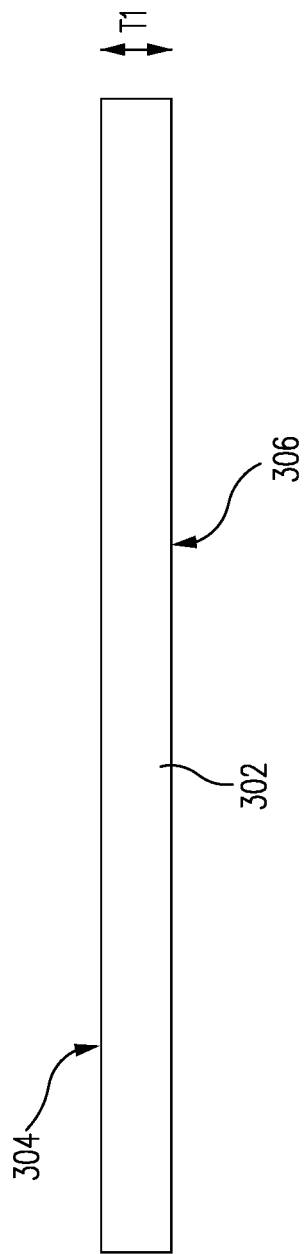
FIG. 3A is a cross-sectional view of an exemplary natural or non-composite veneer sheet used in the construction of exemplary composite wood product mats, panels, and beams as disclosed herein.

FIG. 3A is a cross-sectional view of an exemplary natural or non-composite veneer sheet used in the construction of the exemplary composite wood product mats, panels, and beams disclosed herein.

Figure 3B:
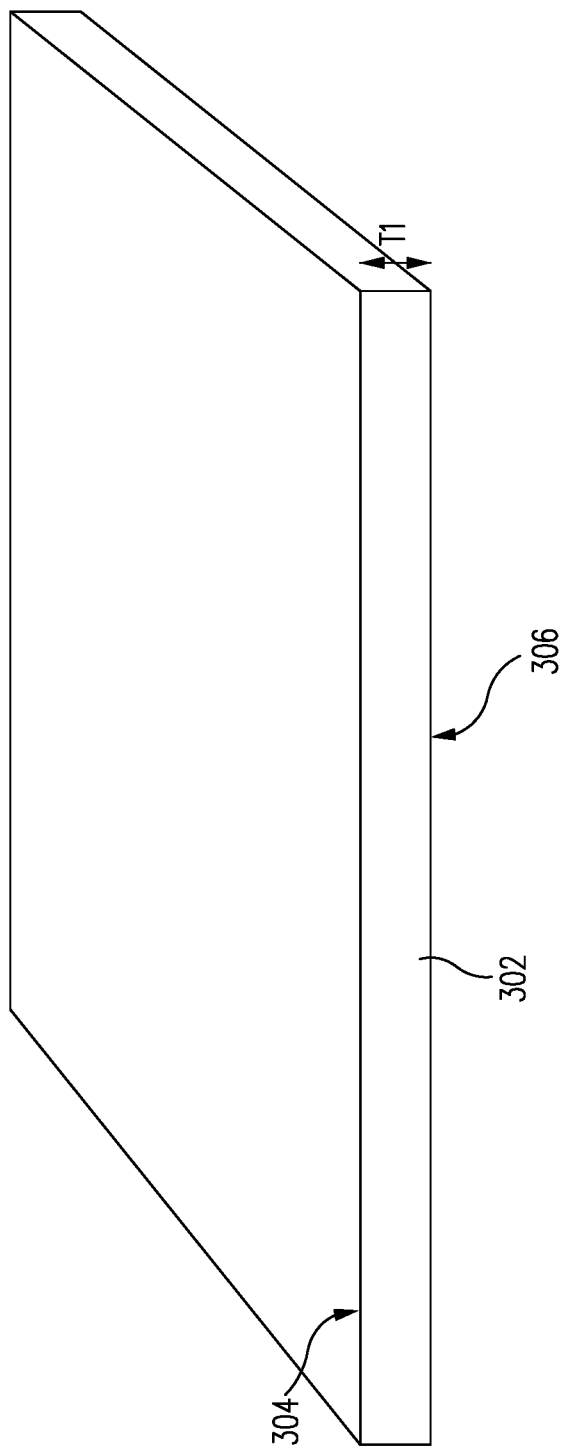
FIG. 3B is a cross-sectional perspective view of an exemplary natural or non-composite veneer sheet used in the construction of exemplary composite wood product mats, panels, and beams as disclosed herein.

FIG. 3B is a cross-sectional perspective view of an exemplary natural or non-composite veneer sheet used in the construction of the exemplary composite wood product mats, panels, and beams disclosed herein.

Referring to FIGS. 3A and 3B a cross-sectional view of a natural veneer sheet 302 similar in construction to natural veneer sheet 102 of FIG. 1 is shown. The natural veneer sheet 302 has an inner surface 304, an outer surface 306, and a thickness of T1.

As discussed above, veneer is a type of wood product that can be obtained by placing a log on a lathe and peeling off a continuous ribbon or sheet having a desired thickness, typically ⅙ inch or less. This continuous ribbon sheet can then be cut to a desired width to create smaller natural veneer sheets of the desired width.

As used herein, the terms "natural veneer sheet" and "non-composite veneer sheet" are used interchangeable to refer to full veneer sheets produced by the process of placing a log on a lathe and peeling off a sheet having a desired thickness and then cutting the sheet into smaller sheets of a desired width. Consequently, as used herein, the terms "natural veneer sheet" and "non-composite veneer sheet" refer to a structure that is a continuous and single sheet of wood. This is in contrast to any composite wood sheets formed of multiple particles, parts, or pieces of wood, such as unoriented superimposed flat wood shavings, and glue, or any composite wood sheets discussed herein, and/or as known in the art at the time of filing, and/or as developed or become known after the time of filing that are composed of two or more particles, parts, or pieces. shavings and glue/adhesive.

In the illustrated example of FIG. 3A, the thickness T1 of the natural veneer sheet 102 is ⅛ inch. During a manufacturing process, the natural veneer sheet 302 can be cut to a desired length and placed on a conveyer belt or other moving surface. The conveyer can be used to move the natural veneer sheet 302 during the remaining steps of the manufacturing process.

Figure 4:
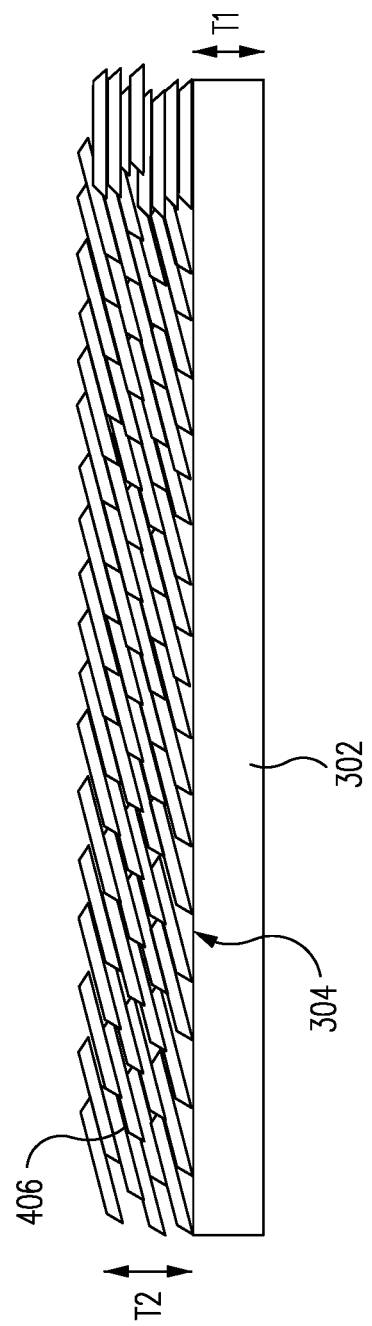
FIG. 4 is a cross-sectional view of an exemplary natural or non-composite veneer sheet and exemplary veneer strands used in the construction of exemplary composite wood product mats, panels, and beams as disclosed herein.

FIG. 4 is a cross-sectional view of an exemplary natural or non-composite veneer sheet and exemplary veneer strands used in the construction of the exemplary composite wood product mats, panels, and beams disclosed herein.

Referring to FIG. 4, a cross-sectional view of the natural veneer sheet 302 of FIG. 3A and a plurality of veneer strands 406, similar in construction to the veneer strands 106 of FIG. 1 is shown.

As discussed above, when the peeling process described above is used to produce natural veneer sheets, it typically also produces veneer pieces that are misshapen and/or of undesirable sizes. These veneer pieces are often structurally sound and just as strong as properly cut natural veneer sheets, yet because they are misshapen and/or of undesirable size, they are typically discarded as a waste product. However, using the teachings disclosed herein, these veneer byproducts can be used to produce composite wood product mats and panels that, in turn, can be used to produce structural wood beams, thereby increasing the efficiency of the veneer production process, reducing the amount of waste produced and lowering the cost of wood product manufacturing. Furthermore, the composite wood products disclosed herein have numerous advantages over traditional composite wood products as described in further detail below.

During the disclosed composite wood product mat, panel, and beam manufacturing process, the veneer strands 406 can be coated in resin or glue or any other suitable means that allow for curing under pressure, heat, or other curing technologies. After the veneer strands 406 are coated in resin or glue, they can be placed on top of the natural veneer sheet 302 as shown in FIG. 4. In some examples, multiple stranders can be used that can each place veneer strands 406 on natural veneer sheet 302. The inner surface 304 of the natural veneer sheet 302 can also be coated with resin, glue, or other adhering means. As such, the veneer strands 406 can stick together and to the natural veneer sheet 302.

Referring to FIGS. 3A, 3B, and 4 together, in some examples, the veneer strands 406 can be placed on top of the natural veneer sheet 302 on its inner surface 304 as the natural veneer sheet 302 is moved along the conveyer. In these examples, the veneer strands 406 can all be released from a single location onto the natural veneer sheet 302 to cover the entire length of the natural veneer sheet 302 as it moves along the conveyer. The veneer strands 406 can also be transferred through the manufacturing process. The veneer strands 406 can be added to the natural veneer sheet 302 until a desired density or thickness T2 of veneer strands 406 is achieved. This allows for the density or thickness of a composite wood product mat to be controlled by the amount of veneer strands 406 that are placed on the natural veneer sheet 302.

In some examples, the strander places strands at a constant rate and the conveyor can move the natural veneer sheet 302 at a speed that achieves a desired density of veneer strands placed onto the natural veneer sheet. If the conveyor moves the natural veneer sheet 302 too fast, the natural veneer sheet will move past the strander before enough veneer strands can be placed on it and the strand density will be too low. If the conveyor moves the natural veneer sheet 302 too slow, too many veneer strands will be placed on the natural veneer sheet before it moves past the strander and the strand density will be too high. In some examples, a density scanner can be used to monitor the density of the strands as they are placed on the natural veneer sheet 302. If one or more areas on the natural veneer sheet 302 are identified as having less than a desirable density, additional veneer strands can be placed on the identified areas of the natural veneer sheet. In some examples, the weight of the raw materials used (e.g., natural veneer sheets and veneer strands) is constantly monitored to ensure a constant density across the length and width of the composite wood product.

In some examples, the veneer strands 406 are placed on top of the natural veneer sheet 302 at varying angles with respect to the natural veneer sheet. This can improve the shear strength or other desirable characteristics of a composite wood product mat manufactured in this manner. In some examples, composite wood product mats manufactured for different applications can have veneer strands 406 applied to the natural veneer sheet 302 at a variety of angles and configurations based on the characteristics desired for a particular application. In some examples where multiple stranders are used, each strander can place veneer strands on the natural veneer sheet 302 at a different angle. In some examples, the veneer strands 406 can comprise a variety of species of wood and each strander can place veneer strands comprising different species on the natural veneer sheet 302. In some examples, different species of wood can be used for different composite wood product mats intended for different applications.

Figure 5A:
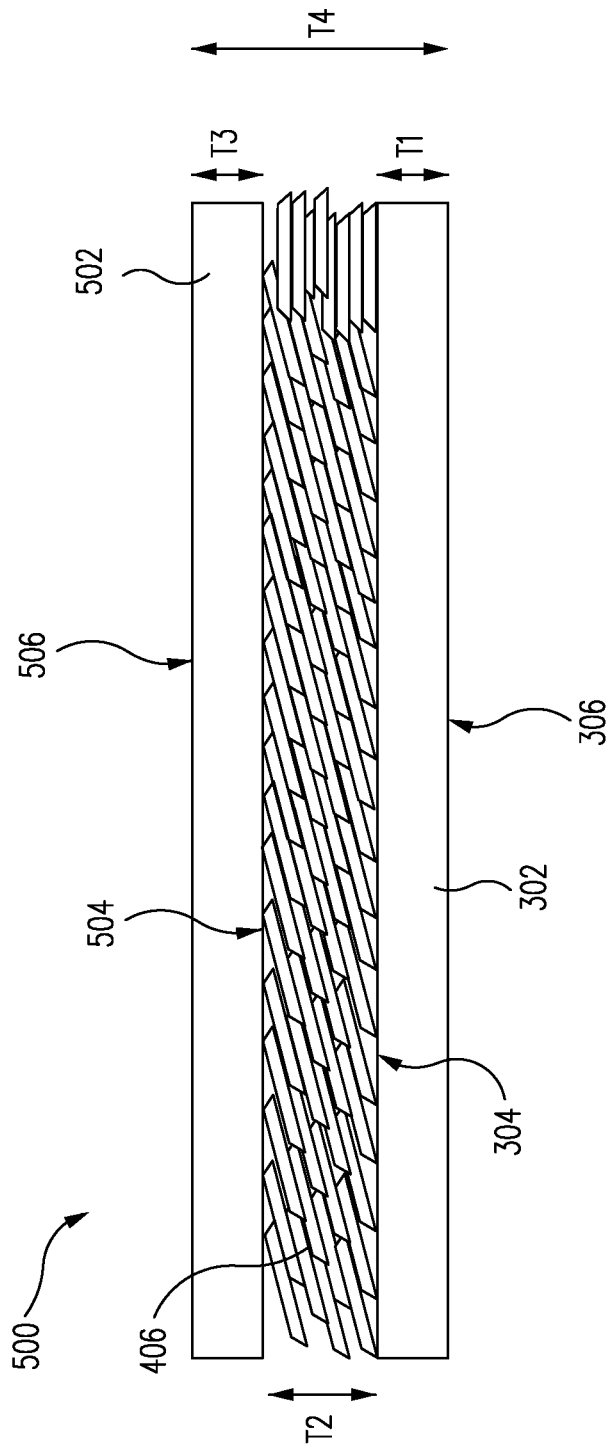
FIG. 5A is a cross-sectional view of exemplary natural veneer sheets and veneer strands used in the construction of exemplary composite wood product mats, panels, and beams as disclosed herein.

FIG. 5A is a cross-sectional view of exemplary natural veneer sheets and veneer strands used in the construction of exemplary composite wood product mats, panels, and beams as disclosed herein.

Figure 5B:
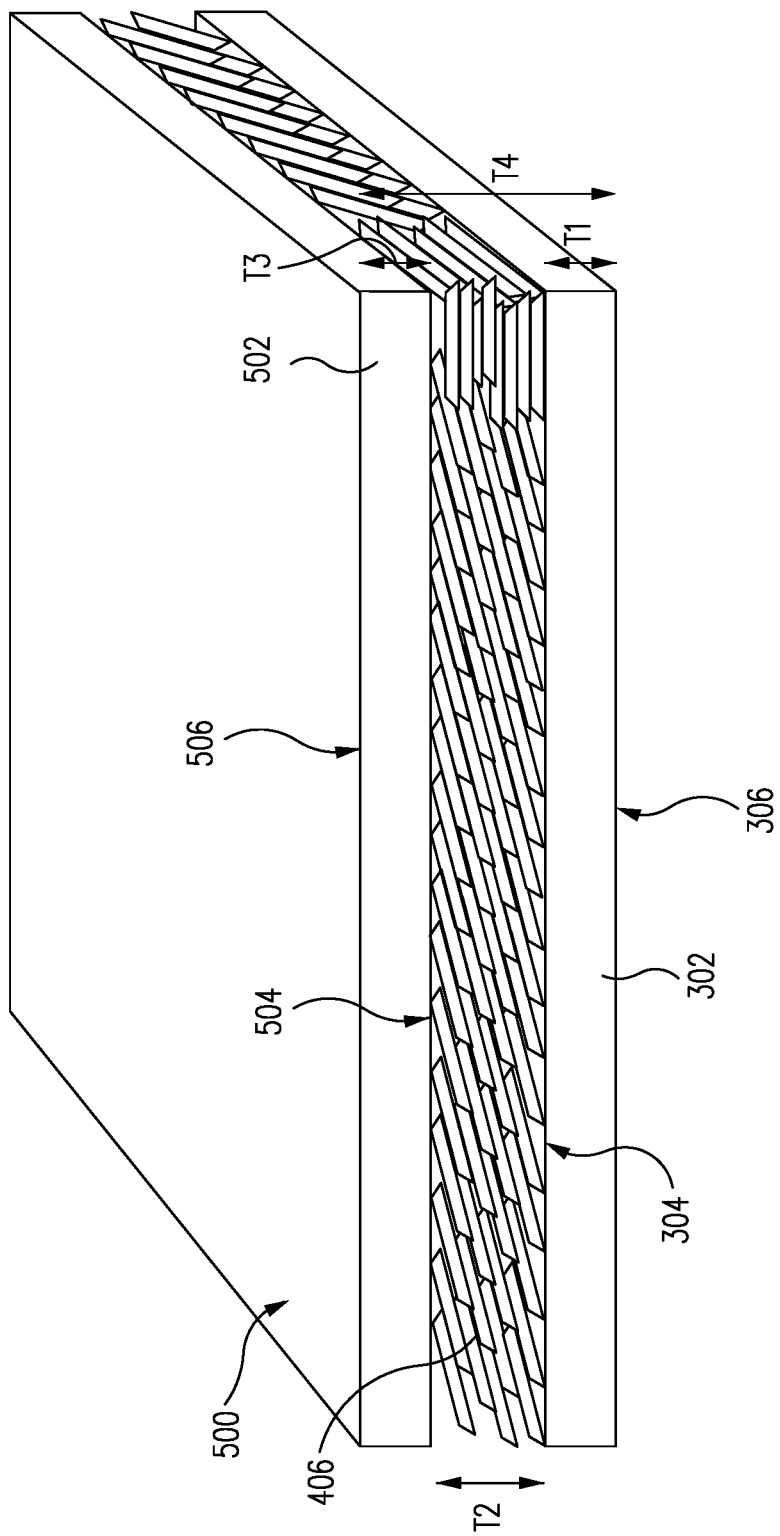
FIG. 5B is a cross-sectional perspective view of exemplary natural veneer sheets and veneer strands used in the construction of exemplary composite wood product mats, panels, and beams as disclosed herein.

FIG. 5B is a cross-sectional perspective view of exemplary natural veneer sheets and veneer strands used in the construction of exemplary composite wood product mats, panels, and beams as disclosed herein.

Referring to FIGS. 5A and 5B a cross-sectional view of the natural veneer sheet 302 of FIGS. 3-4, the veneer strands 406 of FIG. 4 and a natural veneer sheet 502, similar in construction to the natural veneer sheet 104 of FIG. 1 are shown.

As discussed above, veneer is a type of wood product that can be obtained by placing a log on a lathe and peeling off a continuous ribbon or sheet having a desired thickness, typically ⅙ inch or less. This continuous ribbon sheet can then be cut to a desired width to create smaller natural veneer sheets of the desired width.

As used herein, the terms "natural veneer sheet" and "non-composite veneer sheet" are used interchangeable to refer to natural veneer sheets produced by the process of placing a log on a lathe and peeling off a sheet having a desired thickness and then cutting the sheet into smaller sheets of a desired width. Consequently, as used herein, the terms "natural veneer sheet" and "non-composite veneer sheet" refer to a structure that is a continuous and single sheet of wood. This is in contrast to any composite wood sheets formed of multiple particles, parts, or pieces of wood, such as unoriented superimposed flat wood shavings, and glue, or any composite wood sheets discussed herein, and/or as known in the art at the time of filing, and/or as developed or become known after the time of filing that are composed of two or more particles, parts, or pieces. shavings and glue/adhesive.

Referring back to FIGS. 5A and 5B, the natural veneer sheet 502 has a thickness T3. The natural veneer sheet 502 can have a thickness T3 that is the same as the thickness T1 of natural veneer sheet 302. Alternatively, the thickness T3 of natural veneer sheet 502 can be different than the thickness T1 of natural veneer sheet 302. During the disclosed composite wood product mat, panel, and beam manufacturing process, the natural veneer sheet 502 can be cut to a desired length (e.g., the same length as natural veneer sheet 302) and placed on top of the veneer strands 406 after the veneer strands 406 are placed on top of the natural veneer sheet 302. The inner surface 504 of the natural veneer sheet 502 can be coated with resin, glue, or other adhering means. Therefore, the natural veneer sheet 502 can stick to the veneer strands 406.

After the natural veneer sheet 502 is placed on top of the veneer strands 406, the natural veneer sheets 302, 502 and the veneer strands 406 create a mat.

As discussed above, when the peeling process described above is used to produce natural veneer sheets, it typically also produces veneer pieces that are misshapen and/or of undesirable sizes. These veneer pieces are often structurally sound and just as strong as properly cut natural veneer sheets, yet because they are misshapen and/or of undesirable size, they are typically discarded as a waste product. However, using the teachings disclosed herein, these veneer byproducts can be used to produce composite wood product mats and panels that, in turn, can be used to produce composite wood product panels and beams, thereby increasing the efficiency of the veneer production process, reducing the amount of waste produced and lowering the cost of wood product manufacturing. Furthermore, the composite wood products disclosed herein have numerous advantages over traditional composite wood products as described in further detail below.

At this point in the manufacturing process, because the veneer strands 406 are loosely placed on the natural veneer sheet 302, the mat is typically 2-3 inches thick, which is greater than the desired thickness of ⅞ inch of the finished product. Thus, the mat needs to be compressed and the natural veneer sheets and the veneer strands need to be properly glued together. This can be accomplished through the application of heat and pressure and, in the prior art, was typically done in a hot press, where an elevated temperature causes the resin on the components to cure while the mat is compressed. This causes the natural veneer sheets and veneer strands to form together as a finished composite product.

However, as discussed above in connection with the FPINNOVATIONS Publication, if a mat having a thickness of 2-3 inches were placed directly in a hot press, heat would need to be applied for a significant amount of time in order to heat the mat throughout its thickness. Thus, the heat is expected to damage the surface of the mat before the center of the mat reaches a sufficient temperature for the resin to properly cure. This is overcome in the FPINNOVATIONS Publication by pre-heating the mat before placing it in a hot press. This can cause the resin throughout the mat to cure before it is placed into the hot press. While pre-heating the mat in this way will allow it to be placed in the hot press, this requires extra equipment, time, and expense, for performing the pre-heating.

The above problem is overcome in the present disclosure by placing the 2-3-inch-thick composite wood product mat in a "cold" pre-press and compressing the composite wood product mat therein. The pre-press can be a typical pre-press known in the art that wood producers typically have, and is typically cheaper than equipment that would be required for pre-heating. Thus, no extra equipment for pre-heating is needed. Therefore, an initial compression is achieved in the absence of added heat. Additionally, using a pre-press rather than pre-heating the composite wood product mat can reduce assembly time and can allow for more fine control than is possible with pre-heating. The pre-press is not heated and can operate at an ambient temperature. Once a composite wood product mat is placed in the pre-press, pressure is applied to compress the composite wood product mat into a cold pressed composite wood product mat. This causes the composite wood product mat to flatten and reduces its thickness closer to the desired ⅞ inch. Compression in the pre-press puts the veneer strands in intimate contact with each other and causes resin to transfer from strand to strand, thereby more equally distributing the resin throughout the composite wood product mat. The pre-press also stiffens the composite wood product mat such that it can be easily picked up with a forklift or otherwise transferred and placed in the hot-press. In one disclosed example, edge dams are placed around the sides of the pre-press such that the veneer strands do not fall out of the sides of the composite wood product mat during compression.

In some examples, a batch process can be used where multiple composite wood product mats as described above are stacked on top of each other. Then, an entire stack of composite wood product mats can be placed into the pre-press and all of the stacked composite wood product mats can be compressed in the pre-press at once. This can increase the efficiency of the pre-press process. This is another advantage of using a pre-press over pre-heating as it is difficult to properly pre-heat multiple mats stacked on top of each since the heat will likely not be equally distributed across the multiple composite wood product mats.

In examples where such a batch process is used, one composite wood product mat at a time is transferred horizontally into a bunk. The bunk is open on one end so that composite wood product mats can be transferred in horizontally but has tall sides that act as edge dams to prevent strands from falling out of the sides of the composite wood product mats as they are placed into the bunk. After each composite wood product mat enters the bunk, the bunk is lowered to accept the next composite wood product mat transferred horizontally into the bunk. Once a desired number of composite wood product mats are in the bunk, the bunk is picked up with a forklift and placed in the pre-press. The pre-press can comprise a steel platen that can be controlled by hydraulic rams. The platen can be placed in-between the edge dams of the bunk such that it covers the full lengths of the mats. All of the composite wood product mats in the bunk can then be compressed together.

After compressing one or more composite wood product mats in a pre-press, each pre-pressed composite wood product mat can be placed in a hot press, which can be a typical hot press known in the art. The hot press can then compress the pre-pressed composite wood product mats at an elevated temperature. The elevated temperature can cause the glue or resin on the natural veneer sheets and strands to cure and the compression of the hot press can cause the veneer strands to be packed tightly together. Because the composite wood product mat was significantly compressed in the pre-press, the hot press is able to properly distribute heat throughout the thinner mat and compress the composite wood product mat without damaging the outer surfaces. In some examples, the hot press can contain multiple compartments to allow multiple composite wood product mats to be individually compressed at the same time. This can increase the efficiency of the hot press as compared to a process that involves heating only one mat at a time sequentially.

After the pre-pressed composite wood product mat is compressed and cured in the hot press, a composite wood product panel 500 is created. The composite wood product panel can then be cut to a desired length (e.g., 8 feet) and width (e.g., 4 feet). Compression of the composite wood product mat in the hot press allows for fine control of the thickness of the composite wood product panel 500, which can have a thickness T4 equal to T1+T2+T3. In the illustrated example, the thickness T4 of the composite wood product panel 500 is ⅞ inch. If a composite wood product composite wood product panel or beam thicker than ⅞ inch is desired, multiple composite wood product mats or panels can be laminated together, as discussed below in connection with FIG. 6. If a composite wood product panel or beam longer than 8 feet is desired, multiple composite wood product mats or panels can be coupled together using one or more finger joints, as discussed below in connection with FIGS. 7-8. If a composite wood product composite wood product panel or beam thicker than ⅞ inch and longer than 8 feet is desired, a combination of finger jointing and laminating together multiple composite wood product mats or panels can be performed After the natural veneers sheets 302, 502 are compressed, there may be encountered irregularities or indentations on the inner surfaces 304, 504 of the respective natural veneer sheets 302, 502 caused by the veneer strands 406. However, the outer surfaces 306, 506 of the respective natural veneer sheets 302, 502 will remain smooth and flat, which is ideal for many reasons. This can allow for easier transport of the composite wood product panel 500 compared to composite wood products that do not have natural veneer sheets 302, 502 on their outer surface (e.g., traditional parallel strand lumber or multiple particles, parts, or pieces of wood, such as unoriented superimposed flat wood shavings, and glue). The smooth and flat outer surfaces of the disclosed composite wood product mats, panels, and beams can also allow multiple composite wood product mats, panels, and beams to be easily stacked and transported. The compressed natural veneer sheets 302, 502 on the outside of veneer strands 406 also improve veneer recovery by restraining the movement of the veneer strands 406 during manufacturing. The smooth outer surfaces 306, 506 of natural veneer sheets 302, 502, respectively can be laminated, painted, weather protected, coated or otherwise decorated or finished to give composite wood product panel 500 of FIG. 5 a desired look, texture, and/or finish. The smooth outer surfaces 306, 506 of natural veneer sheets 302, 502 also make the composite wood product panel 500 suitable for gluing and/or sanding.

As noted above, other composite wood products such as parallel strand lumber, consists of a large number of strands of lumber (e.g., veneer) glued and pressed together under high pressure to form a composite wood product (e.g., a composite wood product mat). This type of composite wood product made from a large number of strands tends to be stronger, denser, and more consistent than wood products made from only one or a few large pieces of lumber since any imperfections in any of the strands are dispersed throughout the composite product. However, because parallel strand lumber consists solely of strands, the surface of such a product tends to not be as smooth and consistent as the surface of wood products that are not made from strands. There can be void areas between strands on the surface or bits of glue on the surface. Thus, parallel strand lumber can be difficult to use in applications where aesthetics is important and/or that involve affixing fasteners to the surface or laminating additional wood products to the surface to create larger composite products. Thus, these products often require sanding or other additional labor in order for them to have a smooth surface.

As also noted above, some prior art composite wood products sandwich veneer strands between outer layers of composite structures formed of multiple particles, parts, or pieces of wood, such as unoriented superimposed flat wood shavings, and glue. These prior art structures that employ outer layer composite structures formed of multiple particles, parts, or pieces of wood, such as unoriented superimposed flat wood shavings, and glue can represent a cost savings compared to the use of full sheets of veneer cut from ribbons of veneer peeled from logs, i.e., natural or non-composite full veneer sheets. However, when outer layer composite structures formed of multiple particles, parts, or pieces of wood, such as unoriented superimposed flat wood shavings and glue are used the resulting structure is more complicated, harder and more complicated to manufacture, less aesthetically pleasing, and potentially less structurally sound. These disadvantages of outer layer composite structures formed of multiple particles, parts, or pieces of wood, such as unoriented superimposed flat wood shavings, and glue often outweigh the cost savings of these structures, especially when the wood product is used in applications where appearance is important.

In contrast, to these prior art methods and systems, in disclosed embodiments, the outer natural veneer sheets naturally give the finished product smooth outer surfaces. The smooth outer surfaces of the disclosed composite wood product panels and beams can improve fastener performance (i.e., screws, nails, etc.) in the field and allows for better labeling quality, in addition to other benefits. The composite wood product panel 500 can be cross-cut to a desired length and width. In the illustrated example, the composite wood product panel 500 has a length of 8 feet and a width of 4 feet. In other examples, the composite wood product panel 500 can have a different length or width better suited for particular applications. In some examples, void analysis is performed on the composite wood product panel 500 using image analysis software to determine if there are any void areas within the composite wood product panel 500. Void areas can increase the variability of the mechanical properties of the composite wood product mat and thereby decrease its strength. This analysis can be useful to refine the manufacturing procedure to minimize voids in the future.

Figure 6:
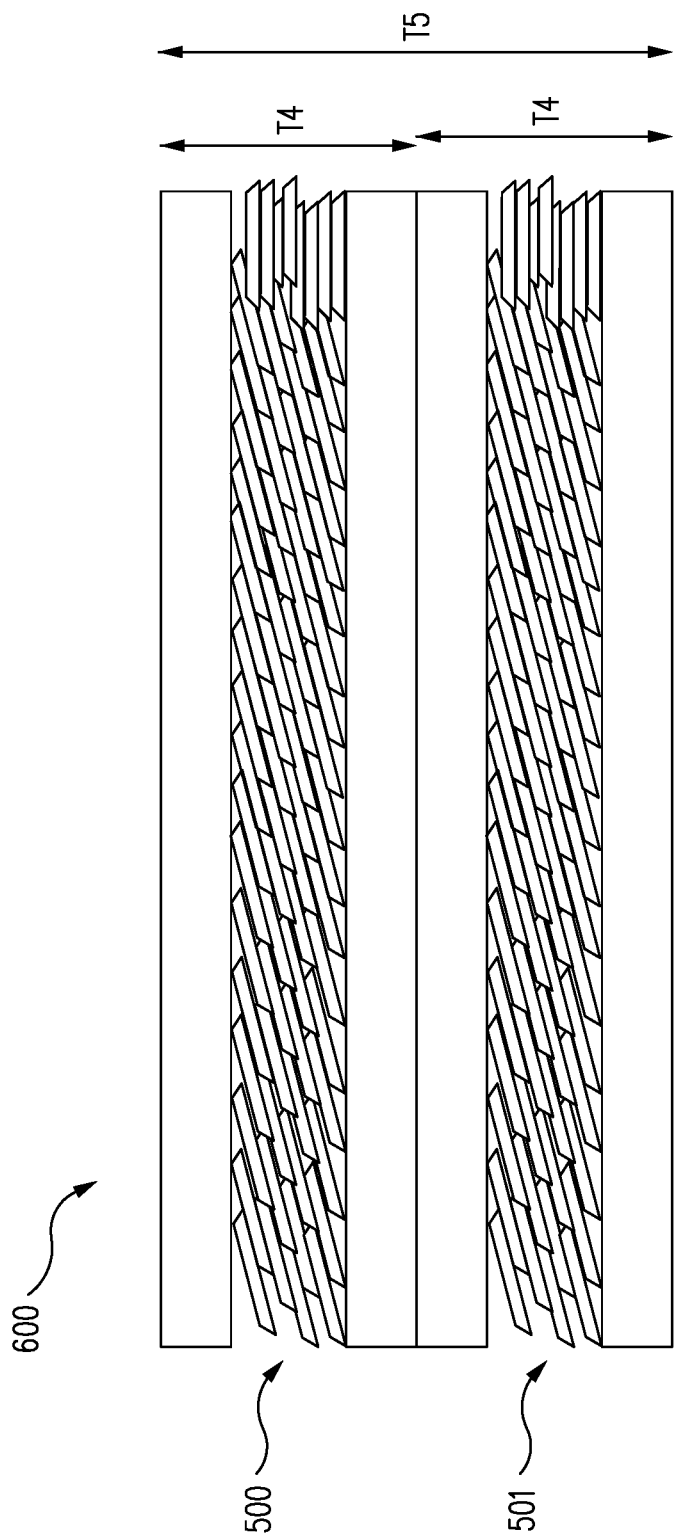
FIG. 6 is a cross-sectional view of an exemplary wood beam formed from two of the composite wood product mats or panels of FIGS. 5A and 5B.

FIG. 6 shows a cross-sectional view of an example wood beam 600. The wood beam 600 is formed by laminating or gluing composite wood product panel 500 of FIG. 5 on top of composite wood product panel 501, which is similar in construction to composite wood product panel 500. The composite wood product panels 500, 501 can have the same thickness T4. As such, when composite wood product panels 500, 501 are glued together, wood beam 600 has a thickness T5 equal to twice the thickness T4. In other examples, any number of composite wood product panels similar to composite wood product panels 500, 501 can be glued together to form a composite wood beam having a thickness equal to any multiple of thickness T4. Because the outer surfaces of composite wood product panels 500, 501 comprise smooth natural veneer sheets, they have a smooth gluing surface such that they can be easily glued and fit snugly together. Additionally, gluing together multiple composite wood product panels s to form a larger wood beam such as wood beam 600 of FIG. 6 can help eliminate warping of the larger wood beam which can be a significant problem for other types of wood beams. In some examples, the disclosed composite wood product panel can be laminated or glued to other types of wood products and/or wood beams such as OSB (oriented strand board), OSL (oriented strand lumber), LVL (laminated veneer lumber), LSL (laminated strand lumber), PLV (parallel laminated vener) or PSL (parallel strand lumber).

Figure 7:
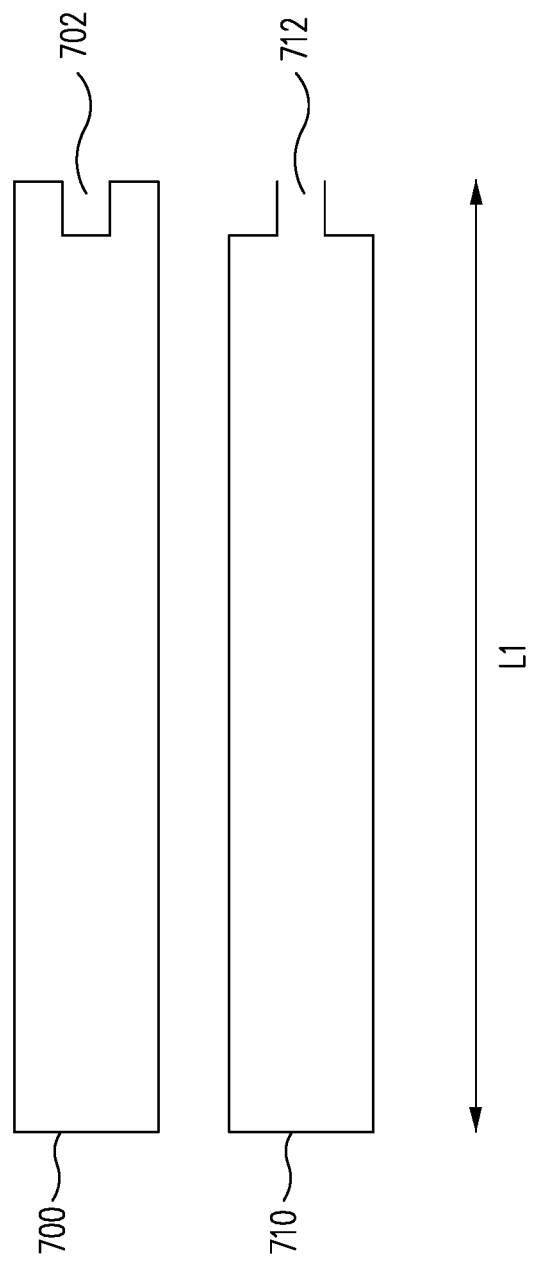
FIG. 7 is a cross-sectional view of exemplary wood panels having finger joints.

FIG. 7 shows a cross-sectional view of example composite wood product panels 700 and 710. Composite wood product panels 700, 710 are similar in construction to composite wood product panel 500 of FIG. 5 except that they have finger joints as discussed herein. For purposes of illustration, the separate natural veneer sheets and veneer strands that make up composite wood product panels 700, 710 are not shown in FIG. 7. Rather composite wood product panels 700, 710 are each illustrated as a solid piece of wood after they have been pressed and cured as discussed in connection with FIG. 5 above. Composite wood product panels 700, 710 each have a length L1. In the illustrated example, the length L1 of composite wood product panels 700, 710 is 8 feet. In other examples, the composite wood product panels 700, 710 can have any other length. Composite wood product panels 700, 710 each have a finger joint at one end which allows multiple composite wood product panels to be connected together to form a longer wood beam. Referring to FIG. 7, composite wood product panel 700 has a female finger joint 702 and composite wood product panel 710 has a male finger joint 712. In other examples, composite wood product panels 700, 710 can each have a unisex or any other type of finger joint. The finger joints 702, 712 can be cut into the ends of composite wood product panels 700, 710 respectively. In some embodiments, the finger joints 702, 712 can be cut into the plurality of veneer strands that make up composite wood product panels 700, 710 (not shown in FIG. 7) that can be similar to veneer strands 406 of FIG. 5. In the illustrated example, the finger joints 702, 712 are about ⅞ inch long. In other examples, the finger joints 702, 712 can have any other length. The finger joint 702 in composite wood product panel 700 can couple with the finger joint 712 in composite wood product panel 710 to form a longer wood beam such as wood beam 800 discussed in connection with FIG. 8. Coupling two or more composite wood product mats together with finger joints to form a longer composite wood beam of a desired length can be cheaper than manufacturing a continuous composite wood product mat having the desired longer length. The natural veneer sheets that comprise the outer faces of composite wood product panels 700, 710, such as natural veneer sheets 302, 502 of FIG. 5, can ensure that composite wood product mats coupled together with finger joints securely fit together.

Coupling multiple composite wood products with finger joints when the composite wood products do not have such outer natural veneer sheets can cause the finger joints to tear or otherwise not securely couple together. In some examples, the disclosed composite wood product mats with finger joints such as composite wood product panels 700, 710 can be coupled to other types of wood beams such as OSB (oriented strand board), OSL (oriented strand lumber), LVL (laminated veneer lumber), LSL (laminated strand lumber), PLV (parallel laminated veneer), or PSL (parallel strand lumber). In examples, where the disclosed composite wood product mat can be connected via finger joints to other types of wood products and/or beams, the disclosed composite wood product mat and the other types of wood beams do not need to be stored and/or catalogued separately since they can be used interchangeably, thereby simplifying inventory procedures.

Figure 8:
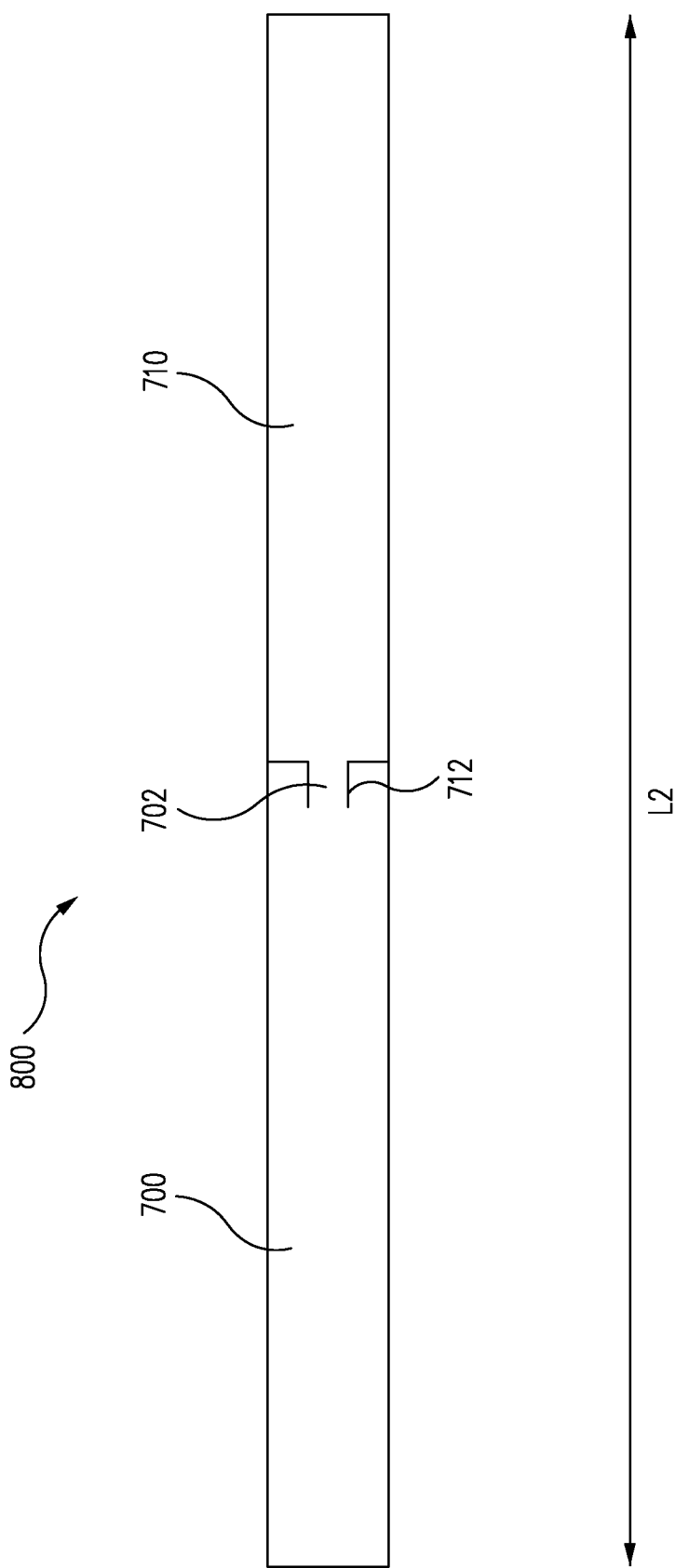
FIG. 8 is a cross-sectional view of an exemplary wood beam formed from the wood panels of FIG. 6 and/or FIG. 7.

FIG. 8 shows a cross-sectional view of a wood beam 800 formed by coupling together composite wood product panels 700, 710 of FIG. 7. Referring to FIG. 8, finger joint 702 of composite wood product panel 700 can be coupled with finger joint 712 of composite wood product panel 710 to form wood beam 800. Composite wood product panels 700, 710 can be glued together at finger joints 702, 712 respectively. The wood beam 800 has a length L2, which can be twice the length L1 of composite wood product panels 700, 710. In some examples, the length L2 of wood beam 800 can be somewhat greater or less than twice the length L1 of composite wood product panels 700, 710 due to the overlapping portions of composite wood product panels 700, 710 from the coupling of finger joints 702, 712. In other examples, any number of composite wood product mats similar to wood beams 700, 710 can be coupled together to form a wood beam having any desired length.

Figure 9:
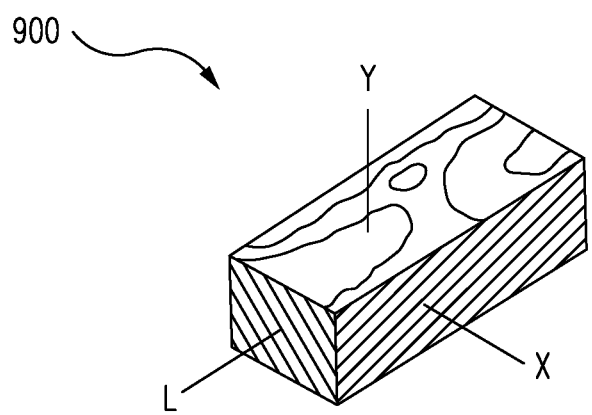
FIG. 9 is a perspective view of the wood beam of FIG. 6.

FIG. 9 shows a perspective view of wood beam 900. Wood beam 900 is similar in construction to wood beam 600. Wood beam 900 can have a length L, a width X, and a thickness Y.

In view of the many possible embodiments to which the principles disclosed herein may be applied, it should be recognized that the illustrated embodiments are only preferred examples and should not be taken as limiting the scope of the disclosure. Rather, the scope of the disclosure is at least as broad as the following claims.

The invention claimed is:
1. A method of manufacturing a composite wood product comprising:
  cutting a first natural veneer sheet to a first length;
  cutting a second natural veneer sheet to the first length;
  coating an inner surface of the first natural veneer sheet with an adhering means;
  coating an inner surface of the second natural veneer sheet with an adhering means;
  coating a plurality of veneer strands with an adhering means;
  placing the plurality of veneer strands on the inner surface of the first natural veneer sheet;
  monitoring a density of veneer strands at various locations on the first natural veneer sheet as the plurality of veneer strands are placed on the inner surface of the first natural veneer sheet;
  placing at least one additional veneer strand at a particular location on the inner surface of the first natural veneer sheet based on the monitored density prior to placing the second natural veneer sheet on the plurality of veneer strands;
  placing the second natural veneer sheet on top of the plurality of veneer strands to create a composite wood product mat;
  compressing the composite wood product mat in an unheated pre-press to transform the composite wood product mat into a pre-pressed composite wood product mat; and compressing the pre-pressed composite wood product mat in a hot press at an elevated temperature to create a composite wood product panel.

2. The method of claim 1, further comprising placing a third natural veneer sheet in a first strander to create the plurality of veneer strands and placing the veneer strands onto the first natural veneer sheet.

3. The method of claim 2, wherein the first strander cuts the third natural veneer sheet into the plurality of veneer strands.

4. The method of claim 3, further comprising placing a fourth natural veneer sheet in a second strander and the second strander cuts the fourth natural veneer sheet into the plurality of veneer strands wherein the first strander places the plurality of veneer strands cut from the third natural veneer sheet onto the first natural veneer sheet and the second strander places the plurality of veneer strands cut from the fourth natural veneer sheet onto the first natural veneer sheet.

5. The method of claim 4, wherein the first strander places veneer strands cut from the third natural veneer sheet onto the first natural veneer sheet at a first angle with respect to the first natural veneer sheet and the second strander places veneer strands cut from the fourth natural veneer sheet onto the first natural veneer sheet at a second angle with respect to the first natural veneer sheet, wherein the first angle is different than the second angle.

6. The method of claim 1, wherein the unheated pre-press has edge dams to prevent one or more of the plurality of veneer strands from falling out of the composite wood product mat while the composite wood product mat is being compressed in the unheated pre-press.

\* \* \* \* \*